Patented Oct. 25, 1949

2,485,910

UNITED STATES PATENT OFFICE 2,485,910

PLASTICIZERS

Latimer D. Myers and Richard W. Webster, Cincinnati, Ohio, assignors to Emery Industries, Inc., Cincinnati, Ohio, a corporation of Ohio No Drawing. Application August 24, 1945, Serial No. 612,544

4 Claims. (Cl. 260—31.2)

This invention relates to a class of materials suitable for plasticizing synthetic resins.

Many synthetic resins are relatively hard, brittle, inflexible bodies by themselves, but become softer and more elastic when they are combined with suitable plasticizers. Plasticizing synthetic resins is a very highly developed art and one which is critically important where elasticity or stretch is of primary importance. In general, the plasticizers of the present invention are particularly intended and adapted for use with the resins of the type generally identified as elastomers, which will be more particularly described at a later point in the description of this invention.

The essential characteristic of a plasticizer is that it must be highly compatible with the resin in the proportions used, and it must not later separate or sweat out, either in storage or in use. Ordinarily, plasticizers are thought of as high boiling solvents for the resins which they are used to plasticize, but this disclosure is not predicated upon the presence of a technical or theoretical chemical solution, as distinguished from practical physical compatibility.

It is also important that the plasticizers be resistant to physical and chemical change when combined with the resin. The plasticizer must not be volatile or at least must be of such low volatility that there is no appreciable loss of plasticizer due to evaporation during the life expectancy of the resin. Likewise, a plasticizer must not deteriorate by oxidation, polymerization or other chemical reaction, except at a rate within the life expectancy of the resin. In any event, the less evaporation or chemical change of the plasticizer, the better.

There are a number of other characteristics of plasticizers which are of greater or lesser importance depending upon the use to which the plasticized resin is to be put. Such other properties include color, odor and taste. Color is of great importance in many cases, particularly in paint and industrial finishes. Odor and taste must be particularly considered in resins used for purposes such as closures for foodstuff containers. Capacity to plasticize at very low temperature is a critical property in many cases, aircraft parts being a good example. Since the final composition may often contain as high as 40 to 50% plasticizer, its cost may be an element not altogether devoid of significance.

It is the purpose of this invention to provide a plasticizer which is compatible with resins, particularly elastomeric resins, and which is relatively non-volatile and chemically stable. It is the further purpose of this invention to synthesize such plasticizers from the unsaturated fatty glycerides and acids which are readily commercially available.

The plasticizers of the present invention are exemplified by isobutyl oleate, 80% saturated by oxygen. This specific material, however, is but one of an almost infinite number of individual plasticizers which may differ from one another slightly chemically, but are substantially equivalent to the exemplary product and are responsive to the basic concept upon which its formulation was predicated.

Broadly speaking, the plasticizers of this invention include alcohol fatty acid esters which are oxidized to a degree which renders them compatible with the resins or the elastomers with which they are to be used. This degree of oxidation can be expressed in several ways. If oleic acid is used as one component of the ester, then the ester should be oxidized until it is at least 60% saturated by oxygen and preferably 80% or more saturated by oxygen. Otherwise expressed, the recommended oxidation reduces the iodine value substantially 50 to 60 points.

If the plasticizer be made from more unsaturated fatty bodies such as linoleic acid or linolenic acids, then the oxidation should be sufficient to reduce the iodine value from 75 to 100 points, but, due to the higher unsaturation, the plasticizers will be 60 to 70% saturated by oxygen.

The oxidation may be accomplished by blowing with oxygen or by blowing with air; the resulting products appear to be identical. If oxygen is used, the reaction proceeds more rapidly, the volumes necessary are less, but a more careful control of the temperature is required.

The esters may be made from any of the unsaturated fatty acids including oleic acid, isoleic acid, the fatty acids of soybean oil, linseed oil, cottonseed oil, fish oil, China-wood oil, oiticica oil and the like. Preferably, the fatty acid is of eighteen carbons or more chain length. The following monohydric alcohols are suitable for use in the practice of this invention which will produce the esters in combination with the specified fatty acids: methyl alcohol, ethyl alcohol, propyl alcohol, isopropyl alcohol, N. butyl alcohol, isobutyl alcohol, secondary butyl alcohol, normal amyl alcohol, isoamyl alcohol, secondary amyl alcohol, octyl alcohol or chemically, 2 ethyl hexanol. All of these monohydric alcohols contain not over 8 carbon atoms.

The glycols and their derivatives are useable but not as effective, they could include: ethylene glycol, diethylene glycol, propylene glycol, monoethyl ether of ethylene glycol, monobutyl ether of ethylene glycol.

These plasticizers are particularly suitable for use with various types of vinyl resins, butadiene and modified butadiene polymers such as butadiene acrylo nitrile and butadiene styrene polymers and the more soluble cellulose derivatives. Isobutyl oleate, for instance, having iodine value of under twenty is compatible with the following resins: polyvinyl chloride, copolymer of vinyl chloride and vinylidene chloride, copolymer of vinyl chloride and vinyl acetate, polyvinyl acetate, polyvinyl butyral, buna N rubber, G. R. S. rubber, ethyl cellulose, nitro cellulose, cellulose acetate butyrate.

This material, however, is incompatible with: cellulose acetate, polystyrene and acrylate resins.

The oxidation treatment is carried out by passing a stream of air, preferably introduced through a dispersing medium, rapidly through the ester at a controlled temperature of from 120 to 160° C. The blowing is continued until sufficient oxygen has been introduced to obtain the desired compatibility. The absorption of oxygen is accompanied by the decrease in iodine value of the ester. In the case of oleate esters, blowing should be continued until the iodine value has dropped about 60 points, or to about 15–20 iodine value. In the case of mixed oleate and linoleate esters such as those obtained from soya bean oil fatty acids, for instance, the iodine value should be decreased about 75 points or to about 40 iodine value. In the case of mixed oleate, linoleate and linolenic esters of the type obtained from linseed oil, compatibility is obtained by dropping the iodine value approximately 100 points or to about 60.

During the blowing operation it is impossible to avoid some increase in free fatty acid content and since for many uses it is desirable to have a low free fatty acid plasticizer, it is expedient to carry out the blowing under conditions which will tend to hold this increase to a minimum, even though a complete elimination of free fatty acid build-up may be impossible.

We have found that small amounts of zinc or lead salts, such as .1–.2% incorporated in the ester, tend to reduce acid buildup. Plasticizers of low, free acid content can be the more readily obtained by using the more highly unsaturated acids such as those acids of soya or linseed oils. For example: where butyl oleate may have 30% free acid content after blowing to the point of compatibility, the butyl esters of linseed oil blown to the same degree of compatibility have only a 9% free acid content.

The free fatty acid content of the blown esters can be reduced to a still lower figure by reesterifying with an alcohol after the blowing has been completed. Such a treatment, however, is not necessary in order to obtain complete compatibility.

We have observed that the blown products also appear to have a considerable stabilizing action on many of the vinyl plastics, particularly those of the vinyl chloride type. Whereas, a mixture of vinyl chloride and dibutyl phthalate, alone, without any stabilizer, becomes almost black when molded, a similar composition, using for example blown butyl oleate, remains light yellow in color. The reason for this apparent stabilizing action is not known as the exact composition of the blown products and the manner in which the oxygen is attached has not been determined, although these products have been studied quite extensively by others in connection with the rancidity of edible fats.

The plasticizers of this invention are light yellow, oily products and are generally lighter than the esters from which they were derived as the color lightens appreciably during the blowing operation. In order to secure the lightest color, the temperature during blowing should not exceed 160° C. The reaction is exothermic and in conducting large-scale operations, it is usually necessary to provide means of cooling.

Our invention is more fully illustrated by the following examples which, however, do not limit the invention.

*Example I*

225.6 parts by weight of commercial oleic acid of 4.6° C. titre were esterified with 88.8 parts of butyl alcohol by refluxing in the presence of 1.125 parts of sodium acid sulfate as a catalyst. After two hours the free acid content had decreased to .7% calculated as oleic acid. 0.5 part of sodium carbonate was added to neutralize the acid catalyst and the excess alcohol removed by distillation.

The resulting ester, amounting to 270.4 parts, was heated to 140° C. and blown with dry air at the rate of 1⅔ volumes of air per minute per volume of oil. The air was introduced through dispersing stones. After twelve hours, the iodine value had decreased from an original value of 78.3 to an iodine value of 16.6 and the free acid had increased to 31.7 as oleic acid.

10 parts of the blown ester and 10 parts of polyvinyl chloride were mixed, preheated to 160° C. for 10 minutes and moulded at 160° C. for 10 minutes. The resulting moulded product was clear, showed no sweating, was a very light yellow color and exhibited good elasticity.

A similar composition prepared with unblown butyl oleate resulted in complete separation of the oleate when moulding was attempted.

*Example II*

The isobutyl ester of oleic acid was prepared using the procedure outlined in Example I.

62.4 parts by weight of this ester was blown with air at a temperature of 140° C. at the rate of 1½ volumes of air per minute per volume of oil. After fourteen hours a test sample showed that the product was completely compatible with the copolymer of polyvinyl chloride and polyvinyl acetate. Blowing was stopped at this point. The iodine value of the isobutyl ester had decreased from an original iodine value of 78.9 to 17.1 and the free fatty acid was 30.5% as oleic acid.

A test moulding using 7 parts of the blown ester and 14 parts of copolymer was clear, elastic and flexible, showed no tendency to oiliness and possessed a good color.

*Example III*

The butyl alcohol ester of linseed fatty acids was prepared using the procedure outlined in Example I.

300 parts by weight of this ester was blown with air at 140° C. After three hours, a test sample showed that the product was compatible with the copolymer of polyvinyl chloride and polyvinyl acetate. Blowing was stopped at this point. The iodine value was reduced from an original iodine value of 148.3 to 59.5 and the free fatty acid was 9%.

A test moulding using 7 parts of the blown ester and 14 parts of polyvinyl butyral was clear, elastic and flexible, showed no tendency to oiliness and possessed a good color.

*Example IV*

135 parts by weight of blown isobutyl oleate, having an iodine value of 17.2 and a FFA of 30.5 was reesterified with 18.5 parts of isobutyl alcohol by refluxing in the presence of 1.35 parts sodium acid sulfate as a catalyst. After 12 hours the free acid content was reduced to 5% calculated as oleic acid. 0.6 part of $Na_2CO_3$ were added to neutralize the acid catalyst and the excess alcohol removed by distillation and the product filtered to remove sodium sulfate.

A test moulding using 10 parts of reesterified blown isobutyl oleate and 10 parts of polyvinyl chloride was clear, elastic and flexible and showed no tendency to oiliness.

*Example V*

Butyl oleate was blown with air as described in Example I except that .1% of lead by weight in the form of lead resinate was added. After 10 hours the iodine value had decreased from 78.3 to 17.2 but the free acidity calculated as oleic acid had increased to only 19.9% as compared to the 31.7% acid content as oleic obtained in Example I.

The product showed equal compatibility, the same plasticizing properties as the product of Example I.

*Example VI*

The methyl ester of soya bean fatty acid was prepared by alcoholysis of 300 parts by weight of soya bean oil with 80 parts methyl alcohol with 1.5 parts of sodium hydroxide as a catalyst by methods well known in the art. After removal of the excess alcohol, catalyst and glycerine, the methyl ester was blown with air until the iodine value was reduced to 41 and the free acid had increased to 15.9% as oleic acid.

A test moulding using 7 parts of the blown ester and 14 parts of vinyl copolymer was clear, elastic and showed no tendency to oiliness and possessed a good color.

Having described our invention, we claim:

1. The method of increasing the compatibility of a vinyl resin with an ester of an 18 carbon unsaturated fatty acid and a monohydric aliphatic alcohol containing not over 8 carbon atoms, said method comprising oxidizing said ester to reduce its iodine value by substantially 60 to 90 points.

2. The method of increasing compatibility of a vinyl resin with isobutyl oleate, said method comprising air blowing said isobutyl oleate to oxygenate it to at least 60% of saturation.

3. The method of plasticizing a vinyl resin which comprises mixing said resin with an oxidized ester of an 18 carbon unsaturated fatty acid and a monohydric aliphatic alcohol containing not over 8 carbon atoms, the iodine value of said ester being substantially 60 to 90 points lower than its iodine value prior to oxidation.

4. The method of plasticizing a vinyl resin which comprises mixing said resin with isobutyl oleate oxidized to at least 60% of saturation.

LATIMER D. MYERS.
RICHARD W. WEBSTER.

REFERENCES CITED

The following references are of record in the file of this patent:

UNITED STATES PATENTS

| Number | Name | Date |
|---|---|---|
| 1,318,461 | Preiswerk | Oct. 14, 1919 |
| 2,200,858 | Clayton et al. | May 14, 1940 |
| 2,305,228 | Woodhouse et al. | Dec. 15, 1942 |
| 2,349,412 | Douglas | May 23, 1944 |
| 2,402,909 | Novak | June 25, 1946 |

OTHER REFERENCES

Atherton et al., Jr. Chem. Soc., 1944, pages 105–108.

Bailey-Indust. Oil & Fat Products, pages 42 and 43, Interscience Publishing Inc.